(12) United States Patent
Simonds et al.

(10) Patent No.: US 6,639,024 B2
(45) Date of Patent: Oct. 28, 2003

(54) COATING A BALL WITH TWO-PART POLYESTER POLYOL-CATALYST/POLYISOCYANATE SYSTEM

(75) Inventors: Vincent Simonds, Brimfield, MA (US); Richard K. Gendreau, Springfield, MA (US); Thomas J. Kennedy, III, Wilbraham, MA (US)

(73) Assignee: The Top-Flite Golf Company, Chicopee, MA (US)

( * ) Notice: Subject to any disclaimer, the term of this patent is extended or adjusted under 35 U.S.C. 154(b) by 139 days.

(21) Appl. No.: 10/036,818

(22) Filed: Nov. 1, 2001

(65) Prior Publication Data

US 2002/0098290 A1 Jul. 25, 2002

Related U.S. Application Data

(62) Division of application No. 08/609,546, filed on Mar. 1, 1996, now Pat. No. 6,340,503.

(51) Int. Cl.[7] .............................. B05D 1/02; B05D 3/02; C08G 18/18; C08G 18/24
(52) U.S. Cl. .................... 525/453; 427/393.5; 473/351; 524/361; 524/365; 524/590; 525/440; 528/58; 528/66
(58) Field of Search .............. 427/393.5; 473/351; 524/361, 365, 590; 525/453, 440; 528/58, 66

(56) References Cited

U.S. PATENT DOCUMENTS

| | | | |
|---|---|---|---|
| 2,729,618 A | 1/1956 | Muller et al. ................. 260/75 |
| 2,912,414 A | 11/1959 | Schulthels et al. ............ 260/75 |
| 3,177,280 A | 4/1965 | Ford et al. ................... 264/275 |
| 3,645,924 A | 2/1972 | Fogiel et al. ............. 260/2.5 AC |
| 3,726,827 A | 4/1973 | Jones et al. .............. 260/31.8 N |
| 3,822,226 A | 7/1974 | Taft et al. ................. 260/18 TN |
| 3,923,746 A | 12/1975 | Barron et al. ......... 260/77.5 AP |
| 3,933,725 A | 1/1976 | Dearlove et al. ..... 260/33.6 UB |
| 3,989,568 A | 11/1976 | Isaac ......................... 156/214 |
| 4,018,745 A | 4/1977 | Peterson .............. 260/77.5 AT |
| 4,070,509 A | 1/1978 | Garner et al. ........... 427/385 R |
| 4,123,061 A | 10/1978 | Dusbiber .................... 273/220 |
| 4,131,606 A | 12/1978 | Ammons ..................... 528/58 |
| 4,150,212 A | 4/1979 | Meyborg ..................... 528/52 |
| 4,169,196 A | 9/1979 | Ehrlich et al. ................ 528/58 |
| 4,185,831 A | 1/1980 | Tominaga ................... 525/329 |
| 4,203,875 A | 5/1980 | Garner et al. ................. 528/58 |
| 4,211,804 A | 7/1980 | Brizzolara .................. 427/377 |
| 4,412,033 A | 10/1983 | LaBelle et al. .............. 524/590 |
| 4,445,688 A | 5/1984 | Frillici et al. ............... 273/82 R |
| 4,452,829 A | 6/1984 | Smith ....................... 428/422.8 |
| 4,454,253 A | 6/1984 | Murphy et al. .............. 521/112 |
| 4,517,222 A | 5/1985 | Blegen ........................ 427/30 |
| 4,520,042 A | 5/1985 | Smith .......................... 427/209 |
| 4,523,003 A | 6/1985 | Bezwada .................... 528/58 |
| 4,582,861 A | 4/1986 | Galla et al. ................... 528/52 |
| 4,607,062 A | 8/1986 | Megna ........................ 528/58 |
| 4,613,403 A | 9/1986 | Oyachi et al. .............. 156/673 |
| 4,616,043 A | 10/1986 | Smith .......................... 528/55 |
| 4,679,794 A | 7/1987 | Yamada et al. ......... 273/235 R |
| 4,695,618 A | 9/1987 | Mowrer ....................... 528/55 |
| 4,738,989 A | 4/1988 | Smith .......................... 528/55 |
| 4,748,192 A | 5/1988 | Smith .......................... 528/55 |
| 4,748,201 A | 5/1988 | Smith .......................... 528/55 |
| 4,802,674 A | 2/1989 | Kitaoh ................... 273/235 A |
| 4,804,734 A | 2/1989 | Vu et al. ....................... 528/54 |
| 4,859,791 A * | 8/1989 | Nodelman et al. .......... 525/440 |
| 4,865,326 A | 9/1989 | Isaac et al. ............. 273/235 A |
| 4,874,831 A | 10/1989 | House et al. ................. 528/48 |
| 4,879,148 A | 11/1989 | Neaves et al. ................ 428/40 |
| 4,955,966 A | 9/1990 | Yuki et al. .............. 273/235 R |
| 4,980,229 A | 12/1990 | Park et al. ................... 428/327 |
| 4,983,461 A | 1/1991 | Daude et al. |
| 5,000,458 A | 3/1991 | Proudfit .................. 273/235 A |
| 5,029,870 A | 7/1991 | Concepcion et al. ... 273/235 A |
| 5,081,203 A | 1/1992 | Pedain et al. ................. 528/49 |
| 5,091,265 A | 2/1992 | Kennedy et al. ............ 428/690 |
| 5,154,950 A | 10/1992 | Rosthauser et al. ......... 427/340 |
| 5,156,405 A | 10/1992 | Kitaoh et al. ........... 273/235 A |
| 5,171,818 A | 12/1992 | Wilson ........................ 528/59 |
| 5,243,012 A | 9/1993 | Wicks et al. ................. 528/58 |
| 5,250,164 A | 10/1993 | Valko .......................... 528/73 |
| 5,300,325 A | 4/1994 | Nealon et al. .......... 273/235 A |
| 5,409,233 A | 4/1995 | Kennedy ................ 273/235 A |
| 5,459,220 A * | 10/1995 | Kennedy ..................... 528/44 |
| 5,494,291 A * | 2/1996 | Kennedy ..................... 524/908 |
| 5,502,100 A * | 3/1996 | Maruoka et al. ............. 524/908 |
| 5,506,292 A * | 4/1996 | Horiuchi et al. ............. 524/908 |
| 5,552,190 A * | 9/1996 | Maruoka et al. ............. 427/457 |

OTHER PUBLICATIONS

Mobay, "Raw Materials for High Performance Coatings", Bayer USA Inc.

Mobay, Product Information—Desmophen 651A–65, Bayer USA Inc.

Mobay, Product Information—Desmophen 800, Bayer USA Inc.

Mobay, Product Data—Desmophen 670A–80, Bayer USA Inc.

Mobay, Product Data—Desmodur N–3200, Bayer USA Inc.

"The Chemistry of Polyurethane Coatings", Mobay Corporation Bayer USA Inc., 1988.

(List continued on next page.)

Primary Examiner—Robert E. L. Sellers

(57) ABSTRACT

A method of coating a game ball with a rapidly curing polyurethane coating system is described herein. The coating system comprises a mixture of a polyol, an isocyanate, a solvent and a high level of catalyst which accelerates the curing process. The coating is a two-part polyurethane system which is preferably applied by spraying. The coating is particularly well-suited for use on golf balls, and also can be applied to other game balls such as softballs, baseballs, cricket balls.

16 Claims, 2 Drawing Sheets

OTHER PUBLICATIONS

Witcobond® W–232 & W–234, Bulletin 344, Organics Division, Witco Corporation, 1986.

Crosslinker CX–100, Bulletin CX–100E, ICI Resins US, ICI Americas Inc.

Miles, Product Information—Desmophen 631A–75, Miles, Inc.

Miles, Product Information—Desmophen 651A–65, Miles, Inc.

Miles, Product Information—Desmpohen 680–70, Miles, Inc.

Air Products, Specialty Additives, Air Products and Chemicals, Inc., 1986.

Kirk–Othmer Online, Chapter Title: Alkyd Resins, Section Heading: Uses and Modifications, John Wiley & Sons (1993).

* cited by examiner

COATING A BALL WITH TWO-PART POLYESTER POLYOL-CATALYST/ POLYISOCYANATE SYSTEM

CROSS REFERENCE TO RELATED APPLICATIONS

This application is a divisional of application Ser. No. 08/609,546, filed Mar. 1, 1996, U.S. Pat. No. 6,340,503.

BACKGROUND OF THE INVENTION

The present invention relates generally to game balls, and more particularly to a method of coating game balls using a coating which cures rapidly.

For decades, golf balls were finished by applying one or more coats of paint or the like to the outer surface of a golf ball cover. To achieve a desirable white appearance, a multicoat paint system typically comprising a primer coat followed by one or more opaque coatings was applied to the golf ball. Such golf balls are typically referred to as "painted balls". In the 1980's, the concept of incorporating pigment into the cover material prior to molding the cover of the golf ball was introduced, thereby eliminating the step of painting the golf ball. Such golf balls are typically referred to as "pigmented balls".

Whether the golf balls are painted or pigmented, identifying indicia such as the manufacturer's trademark or logo, or a model or identification number, are stamped on the ball. In order to prevent the stamped indicia from being rubbed off, and also to impart a desirable glossiness to the ball, one or two clear outer coatings are applied to the ball. Typically, such clear coatings consist of a clear solvent based primer or waterborne primer followed by a clear urethane top coat. The logo or other indicia typically is stamped on the primed ball before application of the top coat. The urethane top coat is usually a two-part polyurethane, consisting of a polyol and a polyisocyanate or polyisocyanurate with at least two —N=C=O groups mixed together and reacted to form the urethane coating.

In golf ball manufacturing, the period of time required to apply and cure the final glossy top coat encompasses a large percentage of the total time required for golf ball manufacture. Known golf ball finish coatings typically require 6–8 hours of curing at an elevated temperature. Curing is generally conducted in a batch-type manner in large ovens.

One advantage of the conventional method for finishing golf balls is that the long cure time of the final top coat ensures that adhesion of the finish coating to the golf ball is strong, and as a result, the golf ball has a long, useful life. Another advantage is that the pot life of the mixed coating is relatively long. However, known methods are disadvantageous in that the 6–8 hour curing time prevents same day delivery of golf balls, particularly customized logo balls. Furthermore, one or more very large ovens are required if a sizable number of golf balls are to be manufactured daily.

In a conventional polyurethane finish coating system for coating golf balls, a polyol and a polyisocyanate or polyisocyanurate with at least two —N=C=O groups are mixed in a pressure pot without a catalyst. The mixture in the pressure pot is then sprayed on the outer surface of the golf balls. Most of the mixture remains in the pot for some period of time before spraying. Thus, it is important to include enough solvent in the coating mixture to prevent the coating mixture from curing while it is still in the pressure pot and to provide for acceptable flowout of the coating mixture. However, it would be environmentally beneficial to be able to reduce the quantity of solvents in the coating system.

SUMMARY OF THE INVENTION

An object of the invention is to provide a method for applying a fast curing coating system to game balls, such as golf balls, softballs, baseballs, cricket balls and the like.

Another object of the invention is to provide a method of making a game ball with a fast curing coating that has adhesion and abrasion resistance which is comparable or superior to prior known urethane coatings.

Yet another object of the invention is to provide a method of making a game ball using a coating system which has a high solids concentration.

A further object of the invention is to provide a method for reducing the time required to cure a finish coating which is applied to the surface of a game ball.

Yet another object of the invention is to provide a method for coating a game ball using a low V.O.C. coating system.

Other objects of the invention will become apparent from the following description.

One preferred form of the invention is a method for coating a game ball. The method comprises the steps of providing an unfinished game ball, applying a fast-curing coating on the outer surface of the ball in an average initial wet thickness of no more than about 3.5 mils, and curing the coating at an elevated temperature for a period of time sufficient to substantially dry and cure the coating. Curing takes place at an elevated temperature for a period of about 5 minutes to 1.5 hours. Preferably, curing is at 110–180° F. for about 5 mins. to ½ hour, and more preferably at about 150–170° F. for about 5–15 mins. The coating used according to the method of the invention comprises a mixture of a polyol, at least one of a polyisocyanate with at least two —N=C=O groups and polyisocyanurate with at least two —N=C=O groups, up to 65 weight % of a solvent based upon the weight of the coating system, and a compatible catalyst. The catalyst is present in a quantity sufficient to provide for an at least 100% increase in viscosity of the coating within 30 minutes after mixing if the mixture is maintained at 25° C., 1 atm and 60% relative humidity.

The catalyst preferably comprises at least one member selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate. The catalyst preferably is present in a quantity of 0.01–10 weight % active catalyst (not including any carrier) based on total resin solids (polyol plus polyisocyanate or polyisocyanurate, excluding solvents). The quantity of catalyst will depend upon the type of catalyst, polyol, polyisocyanate or polyisocyanurate, and solvents which are used, as well as the curing temperature and desired curing time.

When dibutyl tin dilaurate is used as the catalyst, it preferably is present in an amount of about 0.05–0.35 weight % active catalyst based upon total resin solids, and more preferably 0.08–0.15 weight % based upon total resin solids. Excellent results have been achieved using about 0.1 weight % dibutyl tin dilaurate based upon total resin solids. Other catalysts preferably are used at levels which will produce the same state of cure as 0.05–0.35 weight % or more preferably 0.08–0.15 weight % active dibutyl tin dilaurate. The catalyst preferably is present in an amount sufficient to reduce the curing time of the coating by at least about 75% as compared to a coating system which does not contain the catalyst but is otherwise identical.

The polyol preferably comprises at least one of a polyester, polyether or acrylic, and has a hydroxyl equivalent weight of 50 to 1500, and more preferably 100–1000. Blends of different polyols can be used. More preferably, the polyol is a saturated polyester polyol, and most preferably is the reaction product of an organic acid which includes at least one member selected from the group consisting of adipic acid, phthalic acid and isophthalic acid, an anhydride, and a glycol which includes at least one member selected from the group consisting of ethylene glycol and trimethylol propane.

The polyisocyanate or polyisocyanurate with at least two —N═C═O groups preferably includes at least one member selected from the group consisting of biurets and isocyanurate trimers of hexamethylene diisocyanate. Blends of polyisocyanates and/or polyisocyanurates can be used. The solvent preferably includes one or more members selected from the group consisting of ketones, esters and acetates. Another preferred form of the invention is a method of coating a game ball comprising the steps of providing an unfinished game ball, applying a fast curing two-part coating system to the surface of the unfinished game ball in an average initial wet thickness of no more than about 3.5 mils, the coating system comprising a compound containing an active hydrogen atom, at least one of a polyisocyanate with at least two —N═C═O groups, a polyisocyanurate with at least two —N═C═O groups, and a compatible catalyst, the compound containing an active hydrogen atom and the at least one of a polyisocyanate and polyisocyanurate being combined no more than about ten minutes prior to application, and curing the coating at an elevated temperature until the coating is substantially dry, the curing process taking no more than about 1.5 hours.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

Figure 1:
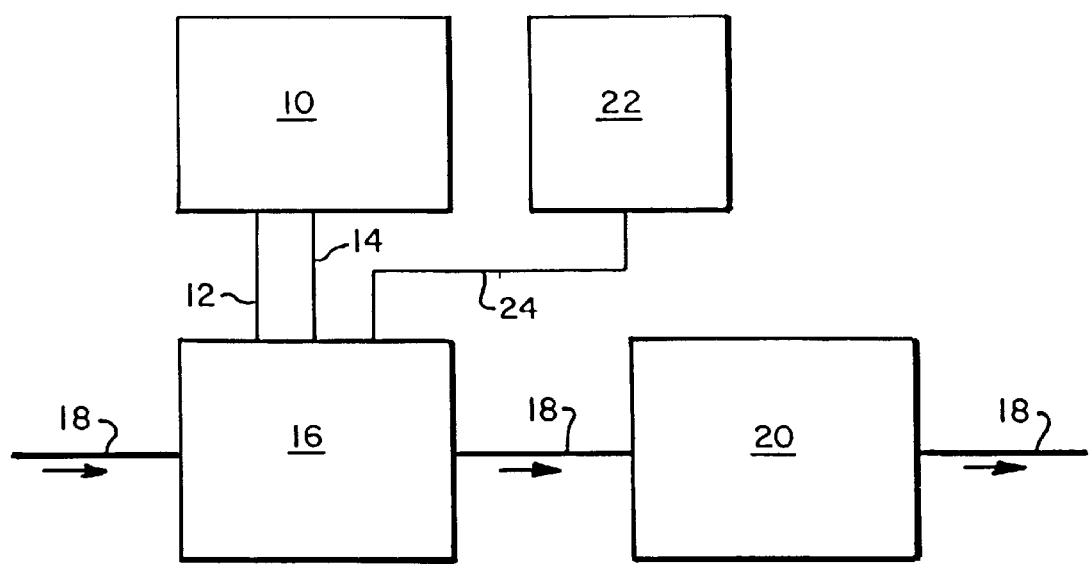
FIG. 1 is a block diagram which generally depicts the method of the invention.

The invention is a method of making a game ball having a highly durable polyurethane coating which is formed from a coating system containing an amount of catalyst which far exceeds the quantity of catalyst recommended by polyurethane coating manufacturers. When the high level of catalyst is used in conjunction with the mixing parameters of the invention, an excellent game ball coating can be formed at a surprisingly fast rate. By using an unexpectedly large amount of catalyst in a system, continuous production is facilitated. The invention further provides for the uniform application of a game ball coating on a dimpled game ball such as a golf ball in which minimal dimple flooding occurs.

The method of the invention can be used for application of primer and/or top coatings, and is particularly useful in applying top or finish coating systems to game balls. When the method of the invention is used to form a final top coating, the coating can be applied to game balls which have a variety of types of primer coatings, including waterborne and solvent-borne polyurethanes, and epoxies.

The final coating can be applied to a primed ball after the primer has been cured under conditions sufficient to drive off 90–98% of the water and solvent in the primer coating system, e.g. after the primed ball has been in a dry oven at 150° F. for about 10 minutes. Furthermore, the coating of the invention can be applied as a final top coating directly to a game ball cover, without the use of a primer coating, when the particular coating system which is used provides for sufficient adhesion to the game ball cover without the use of a primer. In eliminating the primer coating, it is important to take into consideration the difficulty in adhering polymer coatings to certain game ball covers, such as golf ball covers which are made of ionomers or blends of ionomers with other cover materials, due to the presence of olefins in the ionomer. Thus, in some cases, it may be beneficial to treat an unprimed ionomer-containing cover before applying the top coat in a manner appropriate to promote adhesion. For game balls with a cover made of an ionomer having a relatively high zinc content, a thermoplastic polyurethane, or mixtures of ionomers and polyurethanes, it is likely that neither a primer coat nor treatment of the unprimed cover is necessary if the correct top coat is used.

Typically, the average thickness of the final coating is about 0.3 to 2.5 mils after curing, and preferably is about 0.3–2.0 mils after curing.

The coating systems to be used in the present invention are two-part coatings. A preferred coating system has a first part comprising a polyol or another compound containing an active hydrogen atom and a second part comprising a polyisocyanate or polyisocyanurate with at least two —N═C═O groups. The polyols include acrylic, polyether and polyester polyols, as well as alkyds. One particularly preferred coating system is a two part solvent-borne polyurethane system in which the first part comprises a hydroxyl functional polyol having an hydroxyl equivalent weight in the range of 50 to 1500, with the most preferred equivalent weight being 200 to 800. Preferably, the hydroxyl functional polyol is ethylenically saturated. Suitable saturated polyesters for use herein include poly (oxydiethylene adipates) that are condensation products of diethylene glycol and adipic acid, branched with trimethylolpropane or pentaerythritol, and polycaprolactone (hydroxycaproic acid) polyesters. Suitable saturated polyethers include polymers of propylene oxide or propylene oxide/ethylene oxide. Such materials are usually triols or diols with molecular weights between 1000 and 7000. Suitable saturated acrylics include derivatives of acrylic acid, such as methyl methacrylate, co-polymerized with hydroxyl functional monomers, such as 2-hydroxyethyl methacrylate. Suitable (non-limiting) examples of polyols include Desmophen 651A-65, 800, 670A-80, 680-70 and 631A-75, which are saturated polyester resins, available from Bayer Corp., Aroplaz 1133-X-69, a short oil alkyd marketed by Spencer Kellogs Products Div., Reichhold Chemicals, Inc., Minneapolis, Minn., Pentalyn 802A, a phenolic modified polyester resin marketed by Hercules Inc., Wilmington Del., and VMCA, a hydroxyl functional vinyl resin marketed by Union Carbide, Danbury, Conn.

As indicated above, in addition to a polyol, the two-part system comprises a polyisocyanate or polyisocyanurate with at least two —N=C=O groups crosslinking agent carried in a solvent. Various diisocyantes, including but not limited to hexamethylene diisocyanate (HDI), methylene diisocyanate (MDI), toluene diisocyanate (TDI), and isophorone diisocyanate (IPDI) can be used. Aliphatic isocyanates are preferred. Superior color retention, adhesion, and abrasion resistance in the polyurethane top coating can be achieved in the polyurethane top coating when the crosslinking agent is a biuret or isocyanurate trimer of HDI. The biuret of HDI has the following idealized formula:

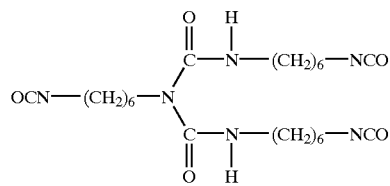

The isocyanurate trimer of HDI has the following idealized formula:

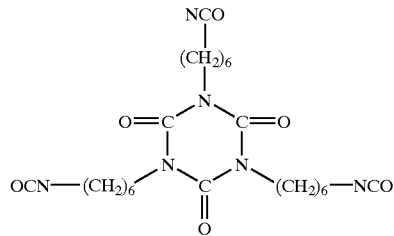

One advantage of the biurets and trimers used herein is that they result in a urethane coating that is U.V. stable per se. Thus, it is contemplated that the coatings of the present invention can be manufactured with lower amounts of U.V. stabilizers incorporated therein, resulting in lower costs of production for the coatings.

The biurets and isocyanurate trimers of HDI utilized in the present invention preferably have a viscosity within the range of about 3 to 10,000 cps, with the preferred range being from about 50 to 5,000 cps. Low viscosity biuret and trimer crosslinking agents are preferred because they allow the total coating system to have a higher solids content and still have a viscosity that facilitates spray painting/air atomization of the coating system on the outer surface of the game ball. Biurets and trimers of HDI contemplated for use herein are sold by Bayer Corp. under the trademark DESMODUR.

One such composition is DESMODUR N-3200, which is a low viscosity biuret of HDI.

The polyisocyanate or polyisocyanurate with at least two —N=C=O groups equivalent weight of the biuret or trimer crosslinking agent used herein preferably is within the range of 100 to 1,200, with 150 to 300 being preferred. The biuret or trimer is carried in a solvent, with the solvent solution containing from a minimum of about 40% (or less, if a quite dilute solution is preferred for some reason), alternatively about 60%, alternatively about 70%, to a maximum of 100%, alternatively about 85%, by weight of the biuret or trimer.

Suitable solvents for the polyisocyanate or polyisocyanurate with at least two —N=C=O groups crosslinking agent include methyl isobutyl ketone, methyl amyl ketone, methyl isoamyl ketone, butyl acetate and propylene glycol monomethyl ether acetate, or mixtures thereof. In a particularly preferred form of the invention, the solvent is present in an amount of 20–65 weight % and even more preferably 40–60 weight % based upon the total weight of the coating system. Urethane grade solvents (i.e. low-moisture solvents) preferably are used.

It is important that the initial viscosity of the coating mixture immediately after the parts of the coating are combined is low enough that the coating can be applied to the game ball surface in a suitable way, such as by spraying. The coating mixture of the present invention preferably has an initial viscosity of 20–100 centipoise, more preferably 25–50 centipoise, and most preferably 30–40 centipoise immediately after the two parts are mixed.

In the two-part systems described above, it is preferable to include a slight excess of the polyisocyanate or polyisocyanurate with at least two —N=C=O groups to insure that all of the polyol or other compound containing an active hydrogen atom will be polymerized. If any excess polyol is present, it will not polymerize and tends to act as a plasticizer, thus resulting in a coating of decreased hardness. Preferably, the index, i.e. ratio of polyisocyanate or polyisocyanurate with at least two —N=C=O groups molecules to polyol is 0.90–1.8, more preferably 1.0–1.3, and even more preferably 1.0–1.1. The most preferred ratio is about 1.05, as this ratio takes into account any water that may be present in the polyol, and any water vapor present in the air.

The polyol, preferably, although not necessarily, is carried in a solvent. If the material is not heated and contains no flow additives, the solvent is preferably added in an amount of about 30–50 wt % of the polyol. If heating and/or flow additives are used, the solvent optionally can be reduced down to 0 wt %. Generally, no more than 65 wt % solvent is added to the polyol part of the coating. Suitable solvents for use herein include the known polyurethane solvents, for example, butyl acetate, methyl isobutyl ketone, methyl amyl ketone, methyl isoamyl ketone, propylene glycol monomethyl ether acetate, and mixtures thereof. Especially preferred as the solvent or co-solvent is methyl amyl ketone because its high dipole constant permits a greater amount of polyol or other resin solids to be dispersed therein. Surface tension modifiers also can be added.

The use of methyl amyl ketone as the solvent for the polyol component, together with a low viscosity biuret or trimer of HDI as the isocyanate component enables a substantially higher solids content to be in the coating system than was traditionally used in game ball coating systems. Some prior known top coat coating systems typically have a solids content of 35%. The coating system of the present invention, however, preferably has a solids content of from 40 to 100%. The higher solids content results in increased transfer efficiency and decreased volatile organic carbon air emission during the spray coating operation. The increased efficiency allows a reduction at least of about 5–10% in the amount of the coating material applied to the ball while still achieving the same coverage as prior art balls.

The catalyst conveniently can be carried in the mixture which includes the polyol. The selection of an appropriate catalyst will depend upon the polyisocyanate or polyisocyanurate with at least two —N=C=O groups which is used, and the type of polyol which is used.

The catalyst is added in an amount which far exceeds that which is recommended by polyurethane coating manufacturers. The amount of any particular catalyst to be used is that which will result in an at least 100% increase in viscosity of a volume of the coating within 30 minutes after combining the first and second parts of the coating if the volume of the coating is maintained at 25° C., 1 atm and 60% relative humidity. The catalyst typically is added in an amount of 0.01–10 weight % active catalyst (not including any carrier) based on total resin solids (polyol plus polyisocyanate and polyisocyanurate, excluding solvents. When the catalyst is dibutyl tin dilaurate, it preferably is added in an amount of 0.05–0.35 weight % active catalyst based upon total resin solids and more preferably 0.08–0.15 weight % based upon total resin solids. Other catalysts can be used alone or in combination, preferably in amounts which produce a result that is equivalent to the result which is obtained with amounts of dibutyl tin dilaurate. Factors such as the activity of the active hydrogen atoms of the coating system, as well as catalyst cost, curing temperature and desired curing time, which may depend upon curing oven availability, may affect the decision as to what quantity of catalyst should be used. Generally, it is desirable to use a quantity of catalyst which is sufficient to achieve at least a 75% reduction in curing time, and more preferably an 85–95% reduction in curing time as compared to the curing time of a coating of the same thickness and having the same composition except that no catalyst is included, and which is cured under the same curing conditions.

Other additives can be included in the first part of the coating system. These additives include U.V. stabilizers and absorbers, leveling agents, optical brighteners, mar and slip agents, antioxidants, and defoaming agents. These materials are added in amounts of 0–20 wt % of the total coating system, or more preferably 1–5 wt %.

U.V. stabilizers function to tie up free radicals in the top coating that are produced upon exposure to ultraviolet radiation, thus maintaining the integrity of the coating. A non-limiting example of a suitable U.V. stabilizer is Tinuvin 292, a hindered amine light stabilizer sold by Ciba-Geigy Corporation, Ardsley, N.Y.

U.V. absorbers function to absorb ultraviolet radiation and re-emit it as heat. Non-limiting examples of suitable U.V. stabilizers for use in the present invention are Tinuvin 1130, a benzotriazole U.V. absorber sold by Ciba-Geigy Corporation, and Sanduvor 3206, an oxalamide derivative sold by Sandoz Chemicals Corporation, Charlotte, N.C.

Suitable leveling agents which reduce the surface tension of the coating for improved coating flow include Fluorad FC-430, a fluorochemical surfactant sold by 3M Industrial Chemical Products Division, St. Paul, Minn., and DOW 57, a silicone additive sold by Dow Corning Corporation, Midland, Mich.

Optical brighteners can be added to the coating system so that the coating coverage can be checked under U.V. light. Suitable optical brighteners include Uvitex OB, 2,2'-(2,5-thiophenediyl) bis(5-ter-butylbenzoxazole), sold by Ciba-Geigy Corporation, Ardsley, N.Y., and Lucopure EGM, a coumarin optical brightener sold by Sandoz Chemicals Corporation, Charlotte, N.C.

In addition to the additives, film-forming agents and/or co-reactants can be incorporated into the polyol or polyamine portion of the coating system. Co-reactants can be, for example, compositions that further polymerize with heat. Film-forming agents include compositions that form a film after the solvent is evaporated during the polyurethane polymerization process. Such materials do not react with the polyisocyanate or polyisocyanurate portion of the coating system, but instead act independently to improve the final coating properties. A suitable polymerizing co-reactant for use herein is Cymel 303, a melamine resin sold by American Cyanamid. An example of a suitable film-forming resin is A-101, an acrylic, non-hydroxyl containing resin sold by Rohm & Haas, Philadelphia, Pa.

When the two parts of a polyurethane coating system are combined, the total system has the following general formulation:

| | |
|---|---|
| Polyisocyanate or polyisocyanurate with at least two —N=C=O groups | 35–100% |
| Solvent | 0–65% |
| Catalyst | e.g. 0.01–10% |
| Additives and/or co-reactants | 0–20%. |

An Example of a preferred coating formulation is provided below, on Table I.

The coating system is applied to a game ball and preferably to a dimpled golf ball which is typically made of an ionomer such as Iotek (a trademark of Exxon Chemical Co., Baytown, Tex.) or Surlyn (a trademark of E.I. DuPont de Nemours & Co., Wilmington, Del.), natural or synthetic balata, or a thermoplastic polyurethane. When the cover is applied over a primer, the fully dried primer preferably, although not necessarily, consists essentially of from about 90% by weight to about 96% by weight, preferably about 90% by weight, of a waterborne dispersion of a resin selected from the group consisting of acrylic resin, polyurethane resin, and combinations thereof, and from about 4% to about 10% by weight, preferably about 5% by weight, of a polyfunctional aziridine crosslinker material. (As used here, "dispersion" includes colloidal emulsions, lattices, and other dispersed forms of the composition.)

The waterborne resin dispersion used in the primer may be an acrylic emulsion or lacquer, for example a material sold by Zeneca Resins Division of Imperial Chemical Industries, PLC, of Wilmington, Del. under the trademark NeoCryl. Particular materials of this type include NeoCryl A-601 and NeoCryl B-723, among others.

The waterborne resin dispersion used in the primer may instead be a polyurethane prepolymer emulsion, for example a material sold by Zeneca, under the trademark NeoRez. A specific NeoRez dispersion useful herein is NeoRez R-960 emulsion. Another material which may be used is WITCO-BOND W-234, supplied by Witco, Organics Division, Chicago, Ill.

Combinations of acrylic and polyurethane dispersions are also contemplated within the scope of the present invention. The waterborne dispersions contemplated herein contain from about 5% to about 90% solids, preferably from about 20% to about 40% solids.

One of ordinary skill in the art is readily able to select a resin dispersion which is useful in a primer for the ball cover materials specified above.

The polyfunctional aziridine crosslinker materials useful herein are preferably tri-or more highly functional compounds. The preferred materials include: pentaerythritol-tris-(β-(N-aziridinyl) propionate); trimethylol-propane-tris-(β(N-aziridinyl) propionate); mixtures of different polyfunctional aziridines identified in U.S. Pat. No. 5,057,371 (for example, from column 3, line 45 to column, line 19); the polyaziridine materials identified in U.S. Pat. Nos. 5,091,239 and 4,842,950; and other polyfunctional aziridines. The patents listed in this paragraph are hereby incorporated herein by reference to exemplify polyfunctional aziridines. Representative polyfunctional aziridines which are useful herein are sold under the trade designations CX-100; XAMA-2; and XAMA-7 by the manufacturers listed in the patents previously incorporated by reference.

Other additives such as flattening agents, surfactants, flow agents, thickeners and defoamers known to those skilled in the art can be incorporated into the primer composition.

The method of the invention is generally depicted in the block diagram of FIG. 1. A polyurethane dispensing system 10 separately stores the first (polyol) and second (isocyanate) parts of the polyurethane coating system and pumps the polyol part and isocyanate part through lines 12 and 14, respectively, to a coating application zone 16. A game ball is delivered to the coating application zone by a conveyor 18. The two parts of the coating are combined in the coating application zone 16 and are applied to the surface of the game ball by spraying, dipping, pouring, brushing wiping or the like. After application of the coating, the conveyor 18 delivers the game ball to a curing zone 20 in which curing takes place. The game ball preferably is substantially cured in 1½ hours or less, more preferably ½ hour or less, and most preferably 15 minutes or less. When the inner walls of the lines in the coating application zone 16 become coated with polyurethane or other materials, a rinsing solvent from a flush supply zone 22 is fed via line 24 through the lines in the coating application zone 16 to remove the coating.

Figure 2:
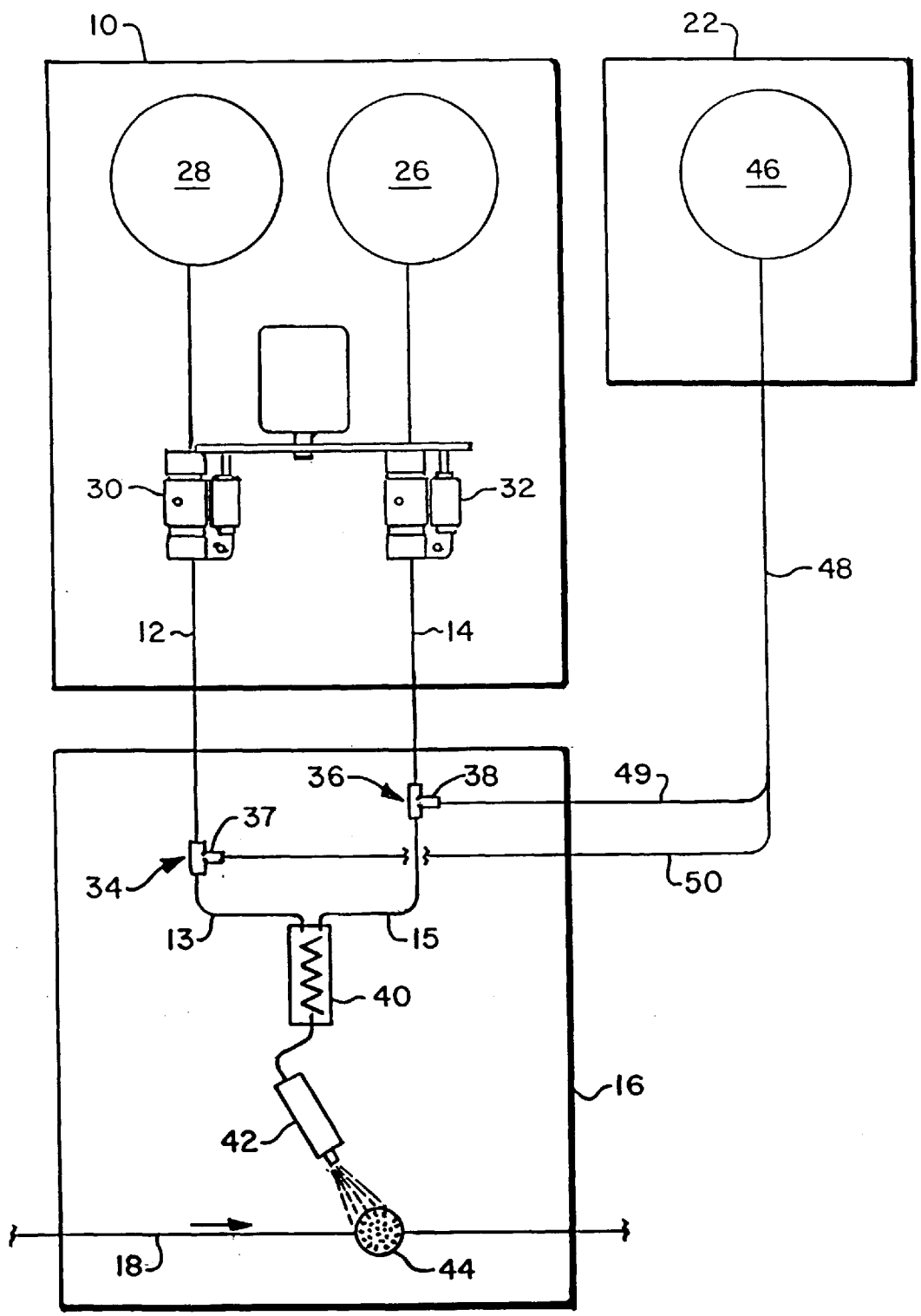
FIG. 2 schematically shows one preferred embodiment of a spray coating apparatus for use in practicing the present invention.

One preferred apparatus for use in practicing the method of the invention includes the polyurethane dispensing system 10, coating application zone 16 and flush supply zone 22, and is shown schematically in FIG. 2. As depicted in FIG. 2, the isocyanate (polyisocyanate or polyisocyanurate with at least two —N=C=O groups) is kept in an isocyanate storage tank 26 and the polyol is kept in a polyol storage tank 28 in the polyurethane dispensing system 10. A polyol pump 30 pumps polyol into line 12 and a separate isocyanate pump 32 pumps isocyanate into line 14. The pumps are driven such that their output is precisely controlled. A polyol metering device 34 such as a valve manifold which is, for example, part of a three-way valve 37 and an isocyanate metering device 36 such as a valve manifold, which may be part of a three-way valve 38, control the flow rate of the polyol through line 13 and isocyanate through line 15 into a static mixer 40. The polyol mixture and the isocyanate mixture are mixed in the static mixer 40 and the mixture is fed substantially immediately into a spray gun 42, from which it is promptly sprayed on the outer surface of a primed game ball 44, such as a golf ball, in a (wet) thickness of, e.g. 0.3–2.0 mils. Most of the mixing of the polyol and isocyanate occurs in the nozzle of the spray gun 42. The game ball is held on a stand during spraying, and its position on the stand is shifted at least once during the spraying process in order to ensure that the entire outer surface of the game ball is coated. In one preferred embodiment of the invention, four game balls can be sprayed simultaneously from four different spray guns. When four spray guns are used, it is advantageous to have a separate polyurethane dispensing system 10, lines 12–15, polyol metering device 34, isocyanate metering device 36, and static mixer 40 for each spray gun 42. If separate systems are used for each spray gun 42, the method of the invention can operate continuously even if one or more of the spray guns is not being used at a particular time. On the other hand, continuous operation of the system likely would be difficult if a single dispensing system 10 were used for four different spray guns and the number of spray guns in use at a particular time fluctuated, because substantial pressure fluctuations likely would occur in lines 12–15, resulting in non-steady state operation of the polyurethane dispensing system 10.

The two-part mixture should not be held for more than about 10 minutes and preferably no more than about 5 minutes in the static mixer 40 before spraying, or it may tend to coat the inside surfaces of the spray gun. The limit as to how long it can be held will vary depending on the exact composition of coating system.

After spraying, the coated game ball is transferred to a hot, 40–60% relative humidity oven for curing. The required curing time-temperature combination will depend upon the composition and thickness of the coating, as well as the type and quantity of catalyst which is used. Typical temperatures are 100–175° F. When temperatures within this range are used, curing is likely to take about one hour at 100 deg. F. or as little as about 5 minutes at 175 deg. F. Particularly preferred curing times are 5–60 mins or even more preferably 5–15 mins, as a rapid curing time of this duration will reduce the total manufacturing time for a game ball by about 5–5¾ hours. To achieve these curing times, preferred curing temperatures range from 110–180° F., or even more preferably about 160° F., 40–60% RH. The dry coating has an average thickness of about 0.4 to 0.8 mils, and has a Sward rocker hardness (ASTM D 2134-66) of at least 10 in less than 1.5 hours, and preferably in less than 10 minutes. The fully cured coating typically has a Sward rocker hardness of 40–70.

After the system has been stopped temporarily, the static mixer 40 and spray gun 42 preferably are rinsed or flushed with a solvent such as ethylene glycol mono ethyl ether in order to remove scaling from their inner walls. In order to rinse the static mixer 40 and spray gun 42, the three way valves 37 and 38 are positioned to permit entry of rinsing or flushing solvent into the static mixer 40 and the spray gun 42 while temporarily preventing entry of the polyol and isocyanate into the static mixer 40 and spray gun 42. The solvent which is stored in flush tank 46 is pressure transferred via line 48 into line 49, which is connected to one inlet of the three-way valve 38, and into line 50, which is connected to one inlet of the three-way valve 37. Rinsing solvent from lines 13 and 15 passes through the static mixer 40 and spray gun 42. The rinsing solvent is collected in a water booth (not shown) in the same way that overspray from the coating application system of the invention and a conventional game ball spray coating system is collected.

One of the important advantages of the quick-cure coating of the invention over prior known coatings is that the reduced curing time lends itself to use of a continuous curing process, as compared to a conventional batch type curing process. Another advantage is that the total energy use for curing a given quantity of game balls is substantially reduced. A third advantage is that because the coating system of the invention is mixed only a short period of time before it is sprayed, coating materials are conserved by mixing only the required quantity.

Having generally described the invention, the following examples are included for purposes of illustration so that the invention may be more readily understood and are in no way intended to limit the scope of the invention unless otherwise specifically indicated.

CONTROL EXAMPLE 1

Five hundred dozen control balls were made having a final top coating formed from a control coating system with a composition identical to the coating system described on Table I below with the exception that the control coating system did not contain any catalyst. To coat the controls balls, the two parts of the non-catalyst coating system were mixed in a pressure pot and were sprayed with a conventional type of spray gun to result in a final coating having a thickness of about 0.6 mils. The coating was applied to primed ionomeric golf balls having a polyurethane primer? coating with a thickness of about 0.4 mils. The primer coat was formed using a Witco waterborne polyurethane system. The golf balls were cured for 6 hours at 125° F., which are conditions appropriate for the urethane reaction to go to approximately 95% completion. After curing, the golf ball top coat had excellent adhesion and did not have an "orange peel" appearance. The control golf balls were used on a driving range for 4 months. During the 4-month period, the balls were washed occasionally, in order to maintain their white appearance. After use, the balls were tested for adhesion and abrasion resistance, and were found to have no lifting or cracking of the top coating in dimples or on lands.

EXAMPLE 1

A two-part polyurethane coating system having the composition shown on Table 1 was prepared, with the polyol part and isocyanate biuret part being kept in separate vessels. The first and second parts were mixed and were then immediately sprayed on the outer surface of two hundred dozen primed golf balls that were identical to the primed, unfinished gold balls used in Control Example 1. The polyol and isocyanate parts were mixed in a ratio of 2 parts by weight of polyol part per 1 part by weight of the isocyanate part. The mixture was sprayed in 440 millisecond increments, with each ball getting two doses of about 90–200 mg net weight for each dose (including overspray). The apparatus used for spraying was a BINKS model 22-575 Ratio Control system (RCS) (Bay State Spray Equipment, Inc., Springfield, Mass.), which was revised and adapted to reduce spraying volume and increase spraying frequency. Each dose of spray was 0.15±2 milliliters. One golf ball was coated every two seconds. The balls were cured for 30 minutes at 130° F. After curing, the balls were dry to the touch and had a final top coating of about 0.6 mils, over a primer coating with a thickness of about 0.4 mils. The balls were examined and were found to have excellent adhesion of the top coat. The adhesion was comparable to that of the control sample. Furthermore, the golf balls did not have an "orange peel" appearance.

One dozen of the golf balls were placed in a weatherometer with a XENON lamp which was operated for 48 hours using cycle 5 at 0.65 W/m$^2$. This set of one dozen golf balls, along with five dozen of the coated golf balls which had not been placed in the weatherometer, were subjected to a wet barrel test which involved soaking the golf balls in water for at least three hours, and then firing each ball 100 times at a velocity of 135 ft/sec at 72° F. into a five-sided container, the walls of which are steel plates that have grooves milled therein to simulate the grooves present on a golf club face. The results of weatherometer and barrel testing were the same for the golf balls of Example 1 as for the control golf balls.

The golf balls which were not subjected to the weatherometer and wet barrel testing were used on the same driving range for four months. During the 4-month period, the balls were washed at the same frequency as the control balls. After the 4-month testing period, the golf balls of Example 1 were tested for adhesion and abrasion resistance and were found to have no lifting or cracking of the top coating, in dimples or on lands, and thus had properties of adhesion and abrasion resistance comparable to that of the control balls.

EXAMPLE 2

The coating formulation of Table I was prepared in two separate parts with the exception that no catalyst was added. The polyol mixture was separated into six separate batches. Dibutyl tin dilaurate catalyst (Dabco T-12, Air Products and Chemicals, Inc., Allentown, Pa., which contains 97 weight % dibutyl tin dilaurate and 3 weight % lauric acid) was added to the polyol part of each batch in a different amount as is shown on Table II below. Catalyst amounts are percent by weight based upon 100 parts by weight of polyol. The sixth batch was the control, and no catalyst was added. Each polyol mixture was combined with a quantity of isocyanate part which corresponds to Table I at 25° C., 1 atm and about 60% relative humidity, and the resulting mixture was placed in a cylindrical container such that the volume of the liquid was that of a cylinder 8 cm high with a diameter of 9.5 cm (180.5 cm$^3$). The viscosity of each of the six coating mixtures was measured at five minute intervals from 0 to 45 minutes. The resulting values of viscosity are shown on Table II.

As shown in Table II, the viscosity of the coating mixture changed very rapidly when high concentrations of catalyst were used.

As will be apparent to persons skilled in the art, various modifications and adaptations of the above described invention will become readily apparent without departing from the spirit and scope of the invention.

TABLE I

|  | phr | % COMPLETE | % PART | wt/gal | Solids | Solids % | MIXTURE | OH EQ % | OH PHR |
|---|---|---|---|---|---|---|---|---|---|
| PART I |  |  |  |  |  |  | OH EQ |  |  |
| 1. Saturated polyester polyol[1] | 100 | 29.81% | 43.75% | 9.2 | 65.00% | 19.376% | 330 | 253.846 | 100.000 |
| 2. Linear saturated polyester polyol[2] | 30 | 8.94% | 13.13% | 9.2 | 80.00% | 7.154% | 500 | 115.385 | 30.000 |
| 3. Solvent 1[3] | 10 | 2.98% | 4.38% | 6.67 | 0.00% | 0.000% |  |  |  |
| 4. Solvent 2[4] | 35 | 10.43% | 15.31% | 7.35 | 0.00% | 0.000% | 0 | 0.000 | 0.000 |
| 5. Solvent 3[5] | 50 | 14.90% | 21.88% | 6.8 | 0.00% | 0.000% |  |  |  |
| 6. Flow additive[6] | 0.3 | 0.09% | 0.13% | 9.16 | 100.00% | 0.089% |  |  |  |
| 7. UV absorber (narrow)[7] | 2 | 0.60% | 0.88% | 8.41 | 100.00% | 0.596% |  |  |  |
| 8. UV stabilizer[8] | 1 | 0.30% | 0.44% | 8.267 | 100.00% | 0.298% |  |  |  |
| 9. Optical brightener[9] | 0.1 | 0.03% | 0.04% | 10.579 | 100.00% | 0.030% |  |  |  |
| 10. Catalyst[10] | 0.15 | 0.04% | 0.07% | 8.747 | 100.00% | 0.045% |  |  |  |
| Subtotal | 228.55 | 68.130% | 100.00% |  |  | 27.589% | 830 | 369.231 | 130.000 |
| PART II |  |  |  |  |  |  | NCO EQ | NCO EQ % | NCO PHR |
| 11. Isocyanate biuret | 66.91 | 19.95% | 62.59% | 9.3 | 100.00% | 19.947% | 181 | 181.000 | 66.913 |
| 12. Solvent 1[3] | 40 | 11.92% | 37.41% | 6.67 | 0.00% | 0.000% |  |  |  |
| Subtotal | 106.91 | 31.870% | 100.00% |  |  | 19.947% |  | 181.000 |  |
| Total | 335.46 | 100.00% |  |  |  | 47.535% |  |  |  |
|  |  |  |  |  |  |  |  |  | MIX RATIO |
|  |  |  |  |  |  |  | Solids | 47.535% | 0.468 |
|  |  |  |  |  |  |  | Index | 1.02 | 140.337 |

[1]Desmophen 651A-65 (Bayer Corp.)
[2]Desmophen 67080 (Bayer Corp.)
[3]Methyl Isobutyl Ketone
[4]Butyl Acetate (Sandoz Chem. Corp.)
[5]Methyl Amyl Ketone (Ciba Geigy Chem. Co.)
[6]3M FC 430 (3M Corp.)
[7]Sanduvor 3206 (Air Prod. Allentown, PA)
[8]Tinuvin 292 (Bayer Corp.)
[9]Uvitex OB (Ciba Geigy Chem. Co.)
[10]DABCO T-12 (Air Prod. Allentown, PA)
[11]Desmodur N-3200 (Bayer Corp.)

TABLE II

| Minutes | Cat. Conc. | Viscosity (cp) |  |  |  | Control (no cat) |
|---|---|---|---|---|---|---|
|  | 0.2% | 0.15% | 0.1% | 0.05% | 0.01% |  |
| 0 | 35 | 35 | 35 | 35 | 35 | 35 |
| 5 | 40 | 40 | 35 | 35 | 35 | 35 |
| 10 | 48 | 45 | 40 | 35 | 35 | 35 |
| 15 | 75 | 55 | 40 | 40 | 40 | 40 |
| 20 | 245 | 85 | 50 | 40 | 40 | 40 |
| 25 | solid | 210 | 60 | 45 | 45 | 40 |
| 30 | solid | solid | 90 | 50 | 45 | 40 |
| 35 | solid | solid | 160 | 60 | 45 | 40 |
| 40 | solid | solid | 660 | 70 | 50 | 40 |
| 45 | solid | solid | solid | 85 | 55 | 40 |

What is claimed is:

1. A method for coating a game ball comprising:

forming a coating system comprising (A) a polyol which is a condensation product of (1) an organic acid which includes at least one member selected from the group consisting of adipic acid, phthalic acid and isophthalic acid, (2) an anhydride, and (3) a glycol which includes at least one member selected from the group consisting of ethylene glycol and trimethylol propane, (B) 0.05 to 0.35 wt % of a catalyst based upon total resin solids, (C) a polyisocyanate which is present in a quantity appropriate to provide a ratio of N=C=O: —OH in the range of 0.9:1 to 1.8:1 and (D) up to 65 wt % of a solvent based upon weight of the coating system, wherein the quantity of catalyst is sufficient to provide for a reduction in cure time of at least 75 percent compared to a cure time of a non-catalyzed system of the same composition;

providing a game ball having an exterior surface;

applying the coating system to the surface of the game ball to form a coating thereon; and curing the coating at an elevated temperature and for a time less than 1.5 hours, wherein the step of forming a coating system comprises the steps of:

providing a coating first part in a first container, the coating first part containing (A) the polyol;

providing a coating second part in a second container, the coating second part containing (C) the polyisocyanate;

adding up to 65 wt % of the solvent to one of the coating first part or the coating second part based upon a weight of the coating system;

adding the catalyst to one of the coating first part or the coating second part; and mixing the coating first and second parts to form the coating system.

2. The method of claim 1 wherein the step of curing takes place at about 150 to 170° F. and requires no more than about one hour.

3. The method of claim 1 wherein the coating achieves a Sward rocker hardness in the range of 40 to 70 in no more than about 1.5 hours.

4. The method of claim 1 wherein the curing step comprises continuously moving the coated game ball through a heated oven.

5. The method of claim 1, wherein the catalyst includes at least one member selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, tetrabutyl titanate, tertiary amines, mercaptides, stannous octoate, potassium octoate, zinc octoate, diaza compounds, diazo compounds and potassium acetate.

6. A method for coating a game ball comprising:

forming a coating system comprising (A) a polyol which is a condensation product of (1) an organic acid which includes at least one member selected from the group consisting of adipic acid, phthalic acid and isophthalic acid, (2) an anhydride, and (3) a glycol which includes at least one member selected from the group consisting of ethylene glycol and trimethylol propane, (B) 0.05 to 0.35 wt % of a catalyst based upon total resin solids, (C) a polyisocyanate which is present in a quantity appropriate to provide a ratio of N=C=O: —OH in the range of 0.9:1 to 1.8:1 and (D) up to 65 wt % of a solvent based upon weight of the coating system, wherein the quantity of catalyst is sufficient to provide for a reduction in cure time of at least 75 percent compared to a cure time of a non-catalyzed system of the same composition;

providing a game ball having an exterior surface;

applying the coating system to the surface of the game ball to form a coating thereon; and curing the coating at an elevated temperature and for a time less than 1.5 hours, wherein the step of forming a coating system comprises the steps of:

providing a coating first part in a first container, the coating first part containing (A) the polyol;

providing a coating second part in a second container, the coating second part containing (C) the polyisocyanate;

adding up to 65 wt % of the solvent to one of the coating first part or the coating second part based upon a weight of the coating system;

adding the catalyst to one of the coating first part or the coating second part; and mixing the coating first and second parts to form the coating system substantially immediately prior to the step of applying.

7. The method of claim 6 wherein the step of curing takes place at about 150 to 170° F. and requires no more than about one hour.

8. The method of claim 6 wherein the coating achieves a Sward rocker hardness in the range of 40 to 70 in no more than about 1.5 hours.

9. The method of claim 6 wherein the curing step comprises continuously moving the coated game ball through a heated oven.

10. The method of claim 6, wherein the catalyst includes at least one member selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tindichloride, tetrabutyl titanate, tertiary amines, mercaptides, stannous octoate, potassium octoate, zinc octoate, diaza compounds, diazo compounds and potassium acetate.

11. A method for coating a golf ball with a coating system comprising:

forming a coating first part in a first container, the coating first part containing a polyol which is a condensation product of (1) an organic acid which includes at least one member selected from the group consisting of adipic acid, phthalic acid and isophthalic acid, (2) an anhydride, and (3) a glycol which includes at least one member selected from the group consisting of ethylene glycol and trimethylol propane;

forming a coating second part in a second container, the coating second part containing a polyisocyanate which is present in a quantity appropriate to provide a ratio of N=C=O:—OH in the range of 0.9:1 to 1.8:1;

adding up to 65 wt % of a solvent to one of the coating first part or the coating second part based upon a weight of the coating system;

adding a quantity of catalyst to one of the coating first part or the coating second part;

mixing the coating first and second parts to form the coating system, wherein the quantity of catalyst added is sufficient to provide for a coating system increase in viscosity of at least 100% within 30 minutes after mixing the coating first and second parts if the mixture is maintained at 25° C., 1 atm and 60% relative humidity;

providing a golf ball having a dimpled exterior surface;

spraying the coating system toward the surface of the golf ball substantially immediately after the step of mixing; and curing the coating at an elevated temperature for a time of no more than 1.5 hours, the coating having a Sward rocker hardness in the range of 40 to 70 when cured.

12. The method of claim 11 wherein the curing step comprises continuously moving the coated golf ball through a heated oven.

13. The method of claim 11 wherein the coating has an average initial wet thickness of no more than about 3.5 mils.

14. The method of claim 11 wherein the coating system has a viscosity in the range of about 20 to 100 centipoise immediately after mixing.

15. The method of claim 11 wherein the coating system has a solids content of at least about 40 percent.

16. The method of claim 11, wherein the catalyst includes at least one member selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tindichloride, tetrabutyl titanate, tertiary amines, mercaptides, stannous octoate, potassium octoate, zinc octoate, diaza compounds, diazo compounds and potassium acetate.

* * * * *